Figure 1:
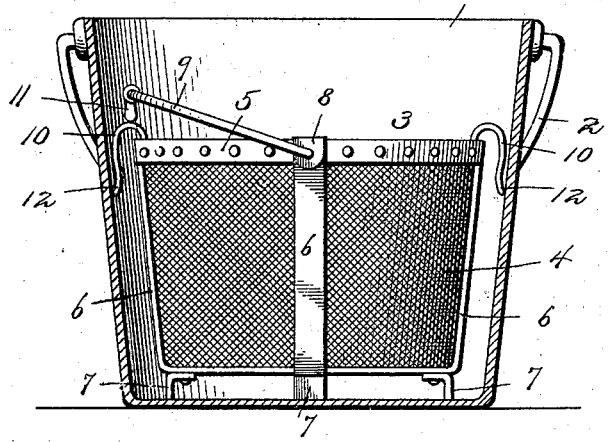

No. 625,586. Patented May 23, 1899.
J. R. MORGAN.
COOKING UTENSIL.
(Application filed Dec. 18, 1896.)

(No Model.)

Witnesses
Harry L. Amer.
K. A. Nau.

Inventor
Jennie R. Morgan.
By U. D. Stockbridge,
Her Attorney

UNITED STATES PATENT OFFICE.

JENNIE R. MORGAN, OF PLACERVILLE, CALIFORNIA.

COOKING UTENSIL.

SPECIFICATION forming part of Letters Patent No. 625,586, dated May 23, 1899.

Application filed December 18, 1896. Serial No. 616,212. (No model.)

*To all whom it may concern:*

Be it known that I, JENNIE R. MORGAN, a citizen of the United States, resididg at Placerville, in the county of El Dorado and State of California, have invented certain new and useful Improvements in Cooking Utensils; and I do hereby declare the following to be a full, clear, and exact description of the invention, such as will enable others skilled in the art to which it appertains to make and use the same.

This invention relates to cooking utensils; and the object in view is to provide what may be termed an "attachment for boiling pots or kettles," having provision whereby it may be placed and located either in the bottom of the boiling-pot or suspended adjacent to the top of the pot for the purpose of draining the water from the vegetables or other material contained therein.

The detailed objects and advantages of the invention will be fully pointed out in the course of the ensuing description.

The invention consists in certain novel features and details of construction and arrangement of parts, as hereinafter fully described, illustrated in the drawings, and incorporated in the claims.

Figure 2:
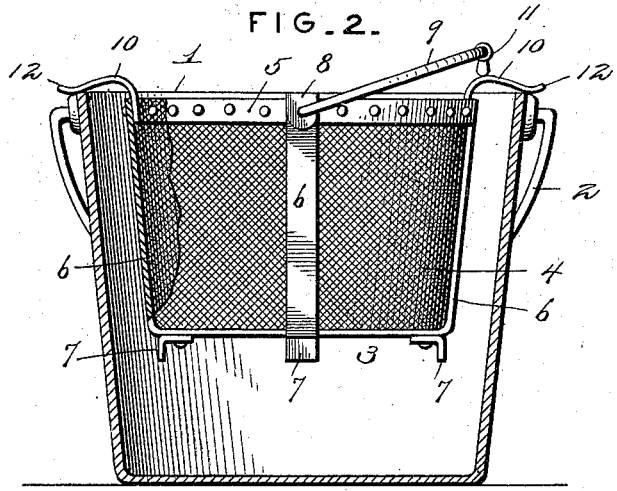
Figure 3:
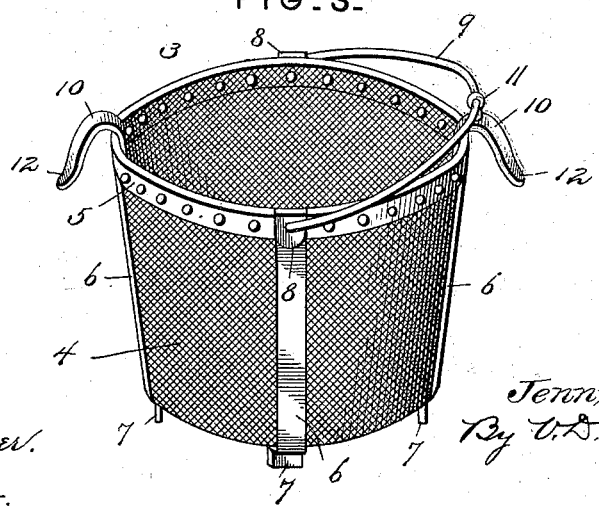

In the accompanying drawings, Figure 1 is a vertical section through a pot, showing the improved receptacle forming the attachment in elevation and arranged in the bottom of the pot. Fig. 2 is a similar view showing the receptacle partly in section and supported at the top of the pot. Fig. 3 is a detail perspective view of the receptacle or attachment *per se*.

Referring to the drawings, 1 designates an ordinary boiling pot or vessel in which meat and vegetables, &c., are cooked, said pot being provided with the usual bail or handle 2.

The receptacle (indicated at 3) is constructed in the main of reticulated material 4, such as meshed wire, and is substantially in the form of a bucket or ordinary boiling-pot. The receptacle 3 is reinforced or strengthened along its upper annular edge by a stout metal band 5, riveted or otherwise connected to the material 4. Connected to the band or rim 5 are stout U-shaped metal bands or strips 6, the terminals of which are firmly united to the rim 5, the central portions thereof extending horizontally beneath the receptacle and intersecting or crossing each other, as shown, two of such strips or bands being employed. Connected to the lower horizontal portions of the strips 6 are L-shaped feet 7, upon which the receptacle rests and which elevate the bottom of the receptacle above the bottom of the pot 1 when the parts are in the position shown in Fig. 1.

The rim 5 is provided at diametrically opposite points with lugs 8, in which are pivotally received the inbent ends of a bail-shaped handle 9, which is thus adapted to be folded down toward either side of the rim 5. Connected to the rim 5 at diametrically opposite points are spring-fingers 10, which also form rests for a button or bail-support 11, the latter being journaled upon the handle 9 at a central point and adapted to swing by gravity, so as to allow its lower end to rest on either one of the fingers 10. Each of the fingers 10 is riveted or otherwise firmly united at one end to the rim 5, as shown, while its opposite end is left free. The finger curves upwardly from the rim 5 and extends outward radially therefrom and then is bent downwardly obliquely, as shown in Fig. 3, the free extremity 12 being finally deflected outward away from the body of the receptacle 3, so as to enable the fingers to be compressed for pushing the receptacle downward into the bottom of the pot, as shown in Fig. 1, or to spread outward in a more nearly horizontal position for engaging and resting upon the top edge of the pot, as shown in Fig. 2.

The vegetables or other materials to be cooked are placed in the receptacle 3 and said receptacle inserted in the pot and pushed downward to the bottom thereof, the spring-fingers 10 being pushed inward, so as to clear the inner walls of the pot 1. When it is desired to drain the vegetables, the receptacle is raised by means of the handle 9, and upon reaching the top of the pot the fingers 10 spring outward and the extremities 12 thereof engage and rest upon the upper edge of the pot, as shown in Fig. 2, it being unnecessary for the operator to touch said fingers, which are of course in a highly-heated condition. By the particular construction and arrangement of said fingers the receptacle 3 may be supported centrally within the pot, so as to allow the water to drain from all sides of the receptacle simultaneously. The button 11 swings by gravity on the handle 9, and it makes no difference to which side of the receptacle the handle 9 is moved the lower end of the button will rest upon one or the other of the fingers 10, which tends to keep the handle 9 cool, so that the receptacle may be lifted when desired.

I do not, of course, desire to be limited to the specific form of the receptacle, as the form and proportions thereof may be varied without departing from the principle or sacrificing any of the advantages of the invention.

Having thus described the invention, what is claimed as new, and desired to be secured by Letters Patent, is—

1. A receptacle for the purpose specified, having a bail-shaped handle pivotally connected thereto, in combination with a button or bail-support pivotally connected to or journaled upon the central portion of the bail, substantially as and for the purpose described.

2. A receptacle for the purpose specified, having a pivoted bail-shaped handle, and a button or bail-support pivotally mounted upon the central portion of the bail, in combination with diametrically opposite fingers attached to the upper edge of the receptacle and located in position to form rests for said button or support, substantially as described.

In testimony whereof I have signed this specification in the presence of two subscribing witnesses.

JENNIE R. MORGAN.

Witnesses:
   T. E. McCARTY,
   G. E. PIERCE.